United States Patent
Taylor et al.

(10) Patent No.: US 7,235,182 B2
(45) Date of Patent: Jun. 26, 2007

(54) PULP STABILISATION APPARATUS FOR A THICKENER

(75) Inventors: David John Buchanan Taylor, New South Wales (AU); Jeffrey Victor Belke, Western Australia (AU)

(73) Assignee: OUTOTEC OYJ, Espoo (FI)

( * ) Notice: Subject to any disclaimer, the term of this patent is extended or adjusted under 35 U.S.C. 154(b) by 0 days.

(21) Appl. No.: 10/507,713

(22) PCT Filed: Mar. 11, 2003

(86) PCT No.: PCT/AU03/00286

§ 371 (c)(1),
(2), (4) Date: Sep. 14, 2004

(87) PCT Pub. No.: WO03/078020

PCT Pub. Date: Sep. 25, 2003

(65) Prior Publication Data

US 2005/0121402 A1    Jun. 9, 2005

(30) Foreign Application Priority Data

Mar. 19, 2002    (AU) ..................................... PS1192

(51) Int. Cl.
*B01D 21/06* (2006.01)
(52) U.S. Cl. .................. 210/800; 210/803; 210/528
(58) Field of Classification Search ............ 210/800, 210/803, 525, 528, 530, 531
See application file for complete search history.

(56) References Cited

U.S. PATENT DOCUMENTS

| | | | | |
|---|---|---|---|---|
| 1,938,894 A | * | 12/1933 | Darby et al. | 210/528 |
| 2,023,295 A | * | 12/1935 | Thackwell | 210/528 |
| 2,259,221 A | * | 10/1941 | Darby et al. | 210/528 |
| 2,268,475 A | * | 12/1941 | Darby | 210/528 |
| 2,274,361 A | * | 2/1942 | Darby | 210/528 |

(Continued)

FOREIGN PATENT DOCUMENTS

BE    860226    2/1978

(Continued)

OTHER PUBLICATIONS

Derwent Abstract No. 692934/39, Class J 01, FR 2334396; Aug. 12, 1977.

(Continued)

*Primary Examiner*—Christopher Upton
(74) *Attorney, Agent, or Firm*—Morgan & Finnegan, LLP

(57) ABSTRACT

The invention provides a flotation device including a thickening tank (1) having right cylindrical sidewalls and a downwardly sloping frusto-conical floor. A drive shaft (2) is centrally rotatably mounted within the tank. Each one of a plurality of rake arms (3) is fixedly connected to the drive shaft and extends radially outwardly, substantially parallel to the tank floor. Each arm supports an array of blades (4) extending axially into the tank. An array of baffles in the form of rectilinear baffle plates (5), fixed relative to the tank, extends axially into the tank in complementary alternate radially spaced relationship with the blades (4). The baffle plates are located within the swept volume of the blades to retard fluid rotation in response to the rotation of the rake. A diametrical service bridge (6) is fixedly connected to the tank for mounting the baffle plates.

23 Claims, 2 Drawing Sheets

U.S. PATENT DOCUMENTS

| | | | | |
|---|---|---|---|---|
| 2,289,112 | A * | 7/1942 | Fischer | 210/530 |
| 2,322,720 | A * | 6/1943 | Scott et al. | 210/528 |
| 2,525,842 | A * | 10/1950 | Thompson et al. | 210/528 |
| 3,521,756 | A * | 7/1970 | Kaminsky | 210/528 |
| 4,082,671 | A * | 4/1978 | Kelly | 210/537 |
| 4,120,791 | A * | 10/1978 | Wright | 210/528 |
| 4,273,658 | A | 6/1981 | Karman | 210/709 |
| 4,462,909 | A | 7/1984 | Kennel | 210/525 |
| 4,681,683 | A * | 7/1987 | Lindstol | 210/803 |

FOREIGN PATENT DOCUMENTS

| | | |
|---|---|---|
| CN | 86201178 | 12/1986 |
| DE | 1141598 | 12/1962 |
| FR | 2334396 | 12/1976 |
| FR | 2410634 | 6/1979 |
| JP | 54-065878 A | 5/1979 |
| WO | WO 01/10530 | 2/2001 |

OTHER PUBLICATIONS

European Search Report for corresponding European Patent Application No. 03706138.9

Communication dated Jan. 27, 2007 form Chinese Patent Office for CN 86201178.

English Translation of Chinese Communication in CN 86201178.

Extract from the Chinese Patent Office database indicating an Approved Publication Date - Dec. 24, 1986 and a Grant Publication Date - Jul. 8, 1987.

* cited by examiner

PULP STABILISATION APPARATUS FOR A THICKENER

FIELD OF THE INVENTION

The present invention relates to separation devices for liquid suspensions and pulps and in particular to an improved thickener. It has been developed primarily for use in separating mineral pulp from a liquid suspension and will be described hereinafter with reference to this application. However, it will be appreciated that the invention is not limited to this particular field of use.

BACKGROUND OF THE INVENTION

The following discussion of the prior art is intended to present the invention in an appropriate technical context and allow its significance to be properly appreciated. Unless clearly indicated to the contrary, however, reference to any prior art in this specification should not be construed as an admission that such art is widely known or forms part of common general knowledge in the field.

Thickeners are known as a means of separating suspended pulps. They are commonly used in the field of mineral processing and extraction, as well as other industries such as paper production.

Known thickeners typically include a thickening tank and a feedwell. The feedwell includes a chamber having an inlet for receiving feed liquid and an outlet in fluid communication with the tank. In use, flocculation takes place in the tank, whereby pulp of higher relative density tends to settle towards the bottom of the tank, forming a bed of thickened pulps and dilute liquor of lower relative density is thereby displaced towards the top of the tank.

The feedwell is configured to reduce the turbulence of the incoming feed stream, to allow flocculants to be mixed into the liquid, and to allow sufficient residence time for reaction between flocculants and reagents before the treated liquid is discharged into the thickening tank. The configuration of the feedwell also promotes even distribution of liquid flowing from its outlet into the thickening tank.

The thickening tank may include a rotatably mounted rake. The rake is typically mounted on a centrally located drive shaft, driven by a motor and an associated gearbox. Each one of a plurality of radially extending rake arms is fixedly connected to the rake and supports an array of fixedly connected rake blades. The blades extend axially into the tank such that as the rake rotates, the blades sweep through the fluid in the tank. This sweeping shears the pulp particles, releasing trapped water, which rises to the surface through the sheared material, allowing the solids to settle into a more dense bed of thickened pulp. This process is referred to in the art as "dewatering". The sweeping also rakes the settled solids to the centre of the tank from where they are discharged.

In contrast to its intended purpose, however, this rake in practice tends to push the whole or part of the settled material around with it, thus preventing it from performing its functions of assisting in the dewatering process and raking the settled solids to the central discharge point. This condition is referred to in the art as "donutting" and impedes the formation of the desired bed of relatively uniform, thickened pulp.

It is an object of the invention to overcome or substantially ameliorate one or more of the deficiencies of the prior art, or at least to provide a useful alternative.

DISCLOSURE OF THE INVENTION

According to the invention, there is provided a separation device including a generally cylindrical thickening tank, and a rake rotatably mounted within said tank, said rake including a plurality of radially extending rake arms each including an array of spaced apart blades extending into said tank, the separation device further including baffle means disposed to retard rotation of fluid within said tank in response to rotation of said rake.

Preferably, the separation device is adapted for use as a thickener for mineral suspensions and pulps.

Preferably, the baffle means includes an array of baffles fixed with respect to the tank and extending generally axially into the tank.

Preferably, the baffles are positioned intermediate respective pairs of blades, such that the baffles and blades are predominantly disposed in alternate radially spaced relationship.

Preferably, the baffles take the form of generally rectangular baffle plates located between adjacent rake blades and within a swept volume of the rake.

In another embodiment, the baffles may be formed from generally triangular or other geometrically shaped plates complementary to similarly shaped rake blades formed from bars, wire, sheet, or plate.

In a further embodiment, the baffles take the form of an effectively continuous barrier, provided by baffle formations including chains, bars, cables or ropes extending generally diametrically across said tank.

Preferably also, the rake is located generally adjacent the tank floor and the blades extend generally upwardly towards the fluid surface. In this case, the baffles are preferably positioned above the rake and extend downwardly through the swept volume.

In one preferred embodiment, the device includes a bridge fixed relative to and extending diametrically across the thickening tank and the baffle plates are fixedly mounted so as to extend downwardly into the swept volume, from the bridge.

According to a third aspect, the invention provides a method of reducing donutting within a thickening tank in response to rotation of a rake including a plurality of radially extending rake arms each including an array of spaced apart blades extending into said tank, said method including the step of providing baffle means disposed to retard rotation of fluid within said tank in response to rotation of said rake.

BRIEF DESCRIPTION OF THE DRAWINGS

A preferred embodiment of the invention will now be described, by way of example only, with reference to the accompanying drawings in which.

PREFERRED EMBODIMENTS OF THE INVENTION

Figure 1:
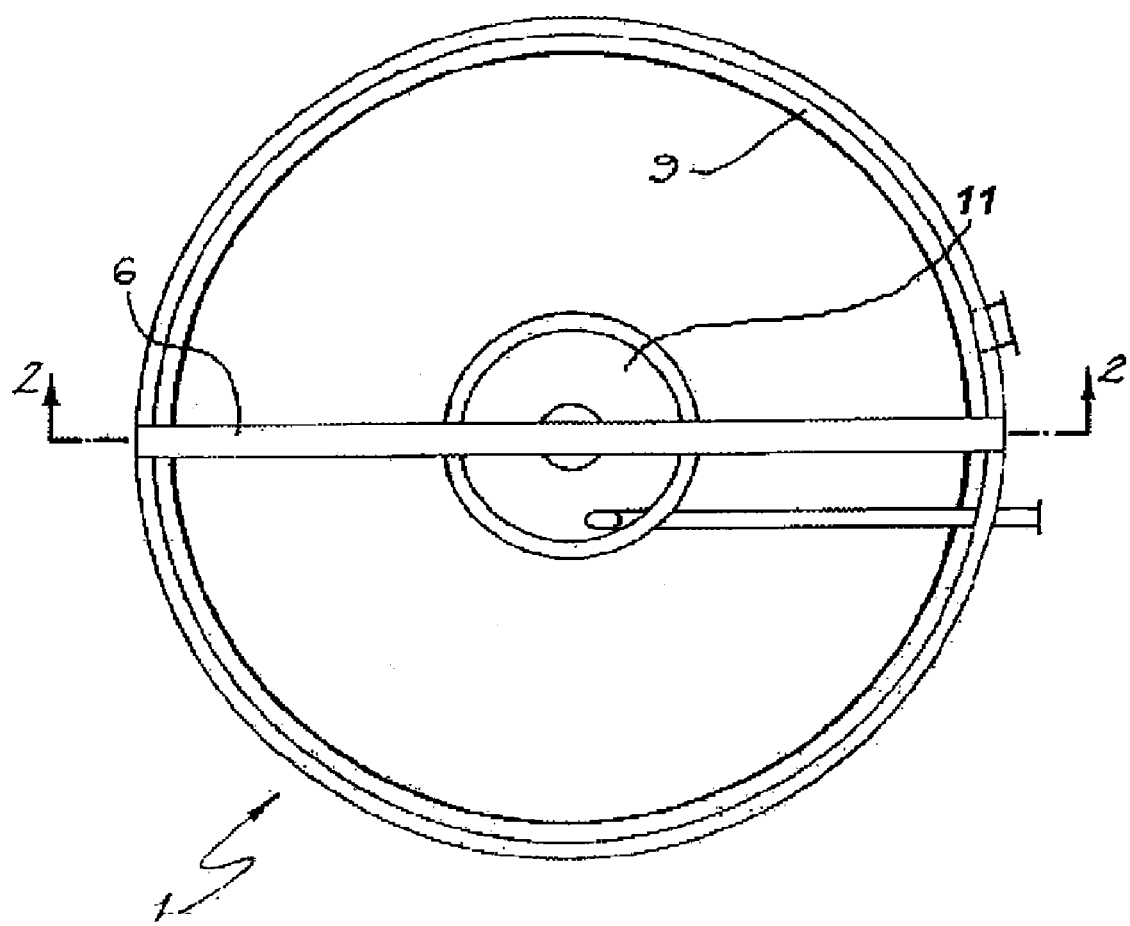
FIG. 1 is a plan view of an separation device according to the invention.
Figure 2:
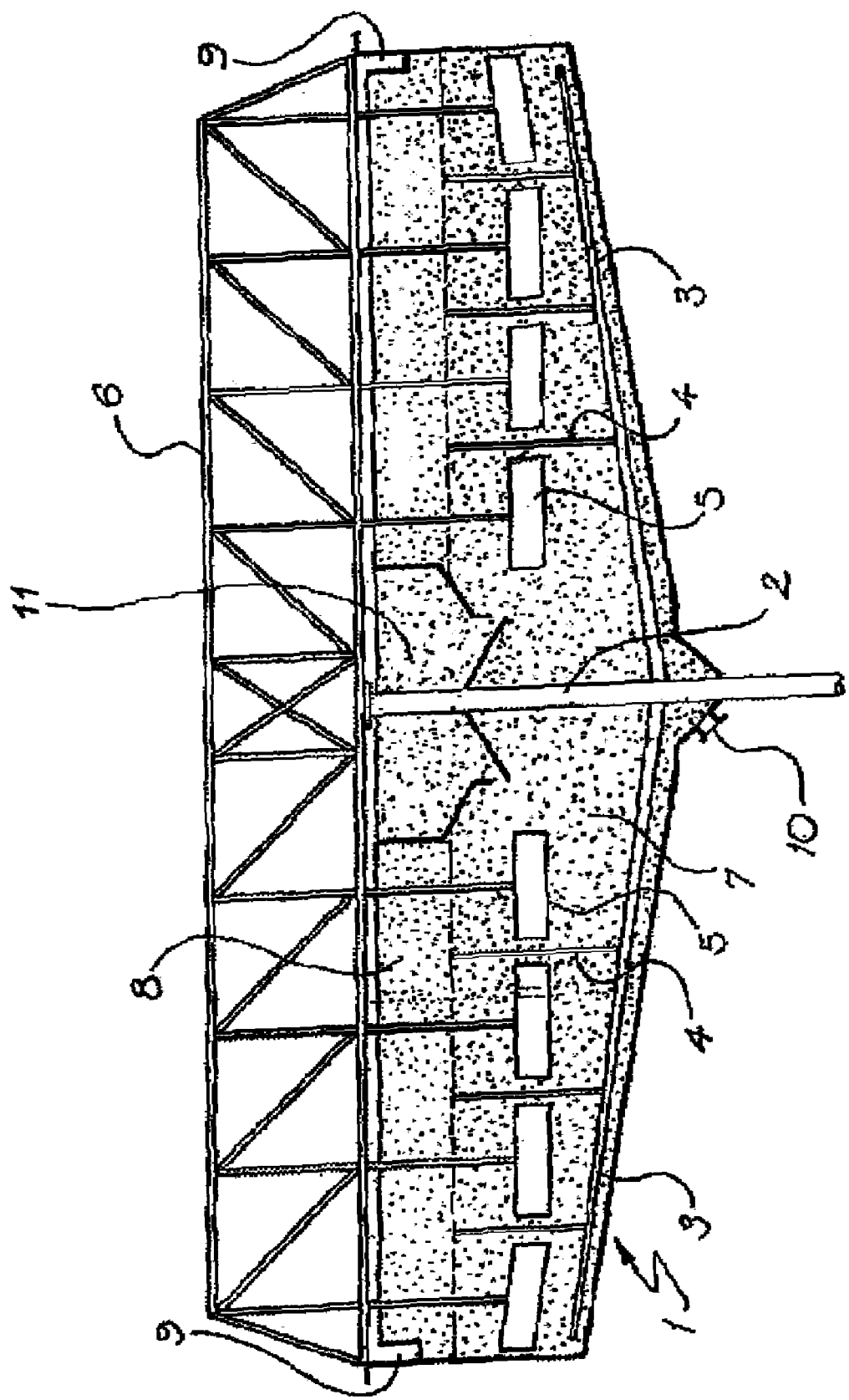
FIG. 2 is a sectional view of the device taken along line 2—2 of FIG. 1.

A preferred application of the invention is in the field of mineral processing, separation and extraction, whereby finely ground ore is suspended as pulp in a suitable liquid medium, such as water, at a consistency which permits flow, and settlement in quiescent conditions. The pulp is precipitated from the suspension by a combination of chemical and mechanical processes. Initially, a flocculating agent is added and mixed into the suspension. The suspension is then carefully mixed to facilitate the clumping together of solid particles, eventually forming larger denser particles that are precipitated out of suspension.

Referring to the drawings, the device includes a thickening tank 1 having right-cylindrical sidewalls and a downwardly sloping frusto-conical floor. A drive shaft 2 is centrally rotatably mounted within the tank. Each one of a plurality of rake arms 3 is fixedly connected to the drive shaft and extends radially outwardly, substantially parallel to the tank floor. Each arm supports an array of blades 4 extending axially into the tank. An array of baffles in the form of rectilinear baffled plates 5, fixed relative to the tank, extends axially into the tank in complementary alternate radially spaced relationship with the blades 4. The baffle plates are located within the swept volume of the blades to retard fluid rotation in response to the rotation of the rake. A diametrical service bridge 6 is fixedly connected to the tank for mounting the baffle plates. The separation device also has a feedwell 11 including a feedwell tank located near the top of the thickening tank 1 and above the rake arms 3.

In use, the rake 2 rotates and the blades 4 pass through the respective clearance spaces provided between adjacent baffle plates, gently sweeping through the fluid to shear the pulp particles, allowing the release of trapped water, which rises to the surface through the sheared material. This, in turn, allows the solids to settle into a more dense bed of thickened pulp 7. The baffle plates 5 retard rotation of the bed of thickened pulp 7 during the sweeping motion of the rake, thereby facilitating the shearing process. The thickened pulp displaces an upper layer of liquid 8, which is progressively drawn off through an overflow launder 9, extending circumferentially around the tank. The thickened pulp 7, on the other hand, is drawn off from below through an underflow withdrawal pipe 10 included at the base of the tank.

It will be appreciated that the baffles of the illustrated device reduce the tendency of the rake to push the thickened pulp around the tank. As a result, the problem of the rake breaking up, or donutting, the thickened pulp is substantially reduced, thereby increasing the efficiency of the pulp separation process. In this respect, the invention represents a practical and commercially significant improvement over the prior art.

Although the invention has been described with reference to a specific example, it will be appreciated by those skilled in the art that the invention may be embodied in many other forms.

The claims defining the invention are as follows:

1. A separation device including a generally cylindrical thickening tank, a feedwell for receiving feed liquid, and a rake for dewatering a bed of thickened pulp in said thickening tank, said feedwell including a feedwell tank located near the top of the thickening tank and above the rake, said rake being rotatably mounted within said thickening tank and including a plurality of radially extending rake arms each including an array of spaced apart blades extending into said thickening tank, the separation device further including baffle means disposed to retard rotation of thickened pulp within said thickening tank in response to rotation of said rake.

2. A separation device according to claim 1, wherein the baffle means includes an array of baffles fixed with respect to said thickening tank.

3. A separation device according to claim 2, wherein said baffles extend generally axially into said thickening tank.

4. A separation device according to claim 2, wherein the baffles are positioned intermediate respective pairs of said blades, such that the baffles and blades are predominantly disposed in alternate radially spaced relationship.

5. A separation device according to claim 2, wherein the baffles take the form of generally rectangular baffle plates located between adjacent rake blades and within a swept volume of the rake.

6. A separation device according to claim 2, wherein the baffles are formed from geometrically shaped plates complementary to similarly shaped rake blades.

7. A separation device according to claim 1, wherein the blades are formed from bars, wire, sheet, or plate.

8. A separation device according to claim 1, wherein the rake is located generally adjacent the thickening tank floor and the blades extend generally upwardly.

9. A separation device according to claim 8, wherein the baffle means is positioned above the rake and extends downwardly through the volume swept by the rake.

10. A separation device according to claim 1, including a bridge fixed relative to and extending diametrically across the thickening tank.

11. A separation device according to claim 10, wherein the baffle means is fixedly mounted to the bridge and extends downwardly into the volume swept by the rake.

12. A method of reducing donutting within a thickening tank, said thickening tank having a feedwell for receiving feed liquid and a rake for dewatering a bed of thickened pulp, said feedwell including a feedwell tank located near the top of the thickening tank and above the rake, said rake including a plurality of radially extending rake arms each including an array of spaced apart blades extending into said thickening tank, said method including the step of providing baffle means disposed to retard rotation of thickened pulp within said thickening tank in response to rotation of said rake.

13. A method according to claim 12, for use in a process for extracting solids from mineral suspensions and pulps.

14. A method according to claim 12, wherein the baffle means includes an array of baffles fixed with respect to said thickening tank.

15. A method according to claim 14, wherein said baffles extend generally axially into said thickening tank.

16. A method according to claim 14, including the step of positioning the baffles intermediate respective pairs of said blades, such that the baffles and blades are predominantly disposed in alternate radially spaced relationship.

17. A method according to claim 14, wherein the baffles take the form of generally rectangular baffle plates located between adjacent rake blades and within a swept volume of the rake.

18. A method according to claim 14, wherein the baffles are formed from geometrically shaped plates complementary in shape to the rake blades.

19. A method according to claim 12, wherein the blades are formed from bars, wire, sheet, or plate.

20. A method according to claim 12, wherein the rake is located adjacent the thickening tank floor and the blades extend generally upwardly.

21. A method according to claim 20, wherein the baffle means is positioned above the rake and extends downwardly through the volume swept by the rake.

22. A method according to claim 12, including the further step of providing a bridge fixed relative to and extending diametrically across the thickening tank and supporting the baffle means from the bridge.

23. A method according to claim 22, wherein the baffle means are fixedly mounted to the bridge and extend generally downwardly into the volume swept by the rake.

* * * * *